US008784978B2

(12) United States Patent
Apoorva et al.

(10) Patent No.: US 8,784,978 B2
(45) Date of Patent: Jul. 22, 2014

(54) MULTILAYER FLAME RETARDANT BARRIER FILMS AND FABRICS

(75) Inventors: Shah Apoorva, Burlington, MA (US); Giaya Arjan, Shrewsbury, MA (US); Kim Yoojeong, Sudbury, MA (US)

(73) Assignee: Triton Systems, Inc., Chelsmford, MA (US)

( * ) Notice: Subject to any disclaimer, the term of this patent is extended or adjusted under 35 U.S.C. 154(b) by 341 days.

(21) Appl. No.: 11/562,836

(22) Filed: Nov. 22, 2006

(65) Prior Publication Data

US 2007/0149678 A1    Jun. 28, 2007

Related U.S. Application Data

(60) Provisional application No. 60/739,048, filed on Nov. 22, 2005.

(51) Int. Cl.
*B32B 27/32* (2006.01)

(52) U.S. Cl.
USPC ........... 428/220; 428/446; 428/453; 428/172; 524/492; 524/493; 524/503

(58) Field of Classification Search
USPC ......... 524/445, 430, 492, 493, 503; 428/35.7, 428/36.6, 474.4, 220, 446, 453, 172
See application file for complete search history.

(56) References Cited

U.S. PATENT DOCUMENTS

| | | |
|---|---|---|
| 4,726,987 A | 2/1988 | Trask et al. |
| 4,975,316 A | 12/1990 | Romanowski |
| 5,321,076 A | 6/1994 | Fujii et al. |
| 5,344,697 A | 9/1994 | Romanowski |
| 5,491,022 A | 2/1996 | Smith |
| 5,844,032 A | 12/1998 | Serrano et al. |
| 5,854,326 A * | 12/1998 | Sakaya et al. .................. 524/445 |
| 6,225,394 B1 | 5/2001 | Lan et al. |
| 6,280,845 B1 | 8/2001 | Kollaja et al. |
| 6,353,048 B1 * | 3/2002 | Onishi et al. .................. 524/400 |
| 6,364,987 B1 | 4/2002 | Takada et al. |
| 6,524,719 B1 * | 2/2003 | Yamane et al. ............ 428/474.7 |
| 6,579,621 B1 | 6/2003 | Shah |
| 2002/0143098 A1 * | 10/2002 | Kawai et al. .................. 524/503 |
| 2003/0096101 A1 * | 5/2003 | Kazeto ........................ 428/323 |
| 2003/0157330 A1 * | 8/2003 | Ostafin et al. ................. 428/404 |
| 2003/0187113 A1 * | 10/2003 | Shiho et al. ................... 524/261 |
| 2004/0198877 A1 * | 10/2004 | Yang et al. .................... 524/115 |
| 2005/0037165 A1 | 2/2005 | Ahern et al. |

FOREIGN PATENT DOCUMENTS

WO    WO 2007/062391 A2    5/2007

OTHER PUBLICATIONS

Clay Minerals, Retrived from website "classes.css.wsu.edu", Jun. 2013.*
Weres et al., Kinetics of silica polymerization, 1981, J. Colloid and Interface Sci. 84(2):379-402.
Rodriguez et al., Surface complexion at the Ti02 (anatase) aqueous solution interface: chemisorption of catechol, 1996, J. Colloid and Interface Sci. 177:122-131.

* cited by examiner

*Primary Examiner* — Gwendolyn Blackwell
*Assistant Examiner* — Ruiyun Zhang
(74) *Attorney, Agent, or Firm* — Pepper Hamilton LLP (57) ABSTRACT

The invention relates to polymer nanocomposites including either silica or non-platelet metal oxide particle and the use of these polymer noncomposites in the core layer of multilayer barrier films and laminates. The polymer nanocomposites provide high-barrier properties and low gas permeation.

31 Claims, 4 Drawing Sheets

MULTILAYER FLAME RETARDANT BARRIER FILMS AND FABRICS

REFERENCE TO GOVERNMENT GRANT

This invention was made with Government support under contract DAAD 16-02-C-0013 awarded by the U.S. Army. The government has certain rights in this invention.

CROSS REFERENCE

This application claims the priority benefit of U.S. Provisional Patent Application No. 60/739,048, entitled "Multilayer Flame Retardant Barrier and Fabrics", filed on Nov. 22, 2005, which is incorporated herein by reference in its entirety.

BACKGROUND

Permeation of molecules through a polymer depends on several factors including the polymers' crystallinity, chain stiffness, molecular orientation, free volume, cohesive energy density, and the ability of the polymer to absorb the permeant molecule. In particular cases, the permeation properties of a given polymer depend on the available free volume within the polymer, and the ease with which polymer chains can re-arrange or relax to increase the free volume. Therefore, as the free volume of the polymer is increased, a molecule may more easily diffuse or permeate through the polymer.

Ethylene vinyl alcohol (EVOH) is a polymer that is produced by complete hydrolysis of random co-polymers of ethylene vinyl acetate and is widely used in food packaging and other barrier films due to its high-barrier and low permeation properties toward gases. The permeation properties of EVOH are largely dependent on the copolymerization ratio of ethylene and vinyl alcohol and high inter- and intra-molecular cohesive energy facilitated by the strong inter- and intra-polymer chain hydrogen bonding. The existing inter- and intra-chain bonding restricts the segmental motion of EVOH polymer chains and reduces the ability of these chains to re-arrange or relax limiting the free volume within the polymer and inhibiting diffusion of permeant molecules.

Barrier films incorporating EVOH polymers are currently used to provide protection against gaseous species such as oxygen, carbon dioxide, aromatic compounds and water vapor.

Accordingly, it is an object of this disclosure to provide a polymer nanocomposite with improved barrier and low permeation properties towards gaseous species such as oxygen, carbon dioxide and water vapor and increased barrier protection against chemical warfare agents such as mustard gas (HD), G-series nerve agents like Sarin (GB), Soman (GD) and V-series nerve agents (VX) for greater than about 72 hours. It is also an object of the disclosure to provide a multilayer barrier film that includes a polymer nanocomposite having improved barrier and low permeation properties that is flame retardant.

SUMMARY

The invention presented herein is generally directed to a polymer nanocomposite comprising ethylene vinyl alcohol and silica particles, metal oxide particles, and combinations thereof, and these polymer nanocomposited may provide a barrier against oxygen, carbon dioxide, water vapor, chemicals, and combinations thereof.

In embodiments, the polymer nanocomposite of claim 1, wherein the silica particles may be about 1 nm to about 500 nm in diameter and may have a surface area of greater than about 50 $m^2/g$. In other embodiments, the silica particles may have surface hydroxyl groups at a concentration greater than about 2 $nm^{-2}$.

The silica particles of embodiments, may generally be dispersed throughout the ethylene vinyl alcohol. In some embodiments, the silica particles may be up to about 5 wt % of the total polymer nanocomposite, and in others, the silica particles are about 0.5 wt % to about 2 wt % of the total polymer nanocomposite.

In some embodiments, the polymer nanocomposite may further include alumino-silicate clay nanoparticles, and the alumino-silicate clay nanoparticles may be organically modified montmorillonite.

The invention also includes a polymer nanocomposite of a polymer and metal oxide particles that are dispersed throughout the polymer.

In embodiments, the metal oxide particles may be alumina, titania, ceria, iron oxide, MgO, ZnO, CaO, CeO, and combinations thereof, and the polymer may be polyolefins, polyamines, and copolymer and mixtures thereof. In certain embodiments, the polymer of the polymer nanocomposite may be ethylene vinyl alcohol.

The metal oxide particles of embodiments may be from about 1 nm to about 500 nm in diameter and may have a surface area greater than about 50 $m^2/g$. In some embodiments, the metal oxide particles may have surface hydroxyl groups at a concentration greater than about 2 $nm^{-2}$. In embodiments, the metal oxide particles may be up to about 5 wt % of the total polymer nanocomposite, and in others, the metal oxide particles are about 0.5 wt % to about 2 wt % of the total polymer nanocomposite.

In some embodiments, the polymer nanocomposite may further include alumino-silicate clay nanoparticles.

The polymer nanocomposites may generally provide a barrier against oxygen, carbon dioxide, water vapor, chemicals, and combinations thereof, and the barrier provided may be a passive barrier, an active barrier, or both a passive and an active barrier.

The invention may further include a barrier film including one or more layers of a polymer nanocomposite, and in some embodiments, the polymer nanocomposite is made up of ethylene vinyl alcohol and silica particles or metal oxide particles. The barrier film of such embodiments may generally provide a barrier against oxygen, carbon dioxide, water vapor, chemicals, and combinations thereof.

In embodiments, the barrier film may be up to about 10 mils thick, and in others, the barrier film may be up to about 2 mils thick. The barrier film of embodiments may be formed by blown film or cast film.

The invention may also include a method for preparing a polymer nanocomposite including providing an ethylene vinyl alcohol polymer, and compounding into the ethylene vinyl alcohol polymer metal oxide particles to make the polymer nanocomposite. In some embodiments, the compounding may occur at a temperature below a melt temperature for the ethylene vinyl alcohol polymer.

The invention may also include a method for preparing a polymer nanocomposite including providing an ethylene vinyl alcohol polymer, dissolving the ethylene vinyl alcohol polymer with at least one solvent, dispersing metal oxide particles in the dissolved ethylene vinyl alcohol polymer, and removing the at least one solvent to make the polymer nanocomposite. In some embodiments, the solvent may be an aromatic solvent, halogenated solvent, and combinations thereof.

Other embodiments of the invention include a method for preparing a polymer nanocomposite including incorporating metal oxide particles into an ethylene vinyl alcohol precursor, and hydrolyzing or polymerizing the ethylene vinyl alcohol precursor to ethylene vinyl alcohol to make the polymer nanocomposite.

The invention further includes a multi-layer barrier film or laminate including at least one core layer of a polymer nanocomposite having an upper surface and a lower surface with the polymer nanocomposite being made up of ethylene vinyl alcohol and silica particles, and at least one second layer adjacent to the upper surface of the core layer and at least one third layer adjacent to the lower surface of the core layer with the at least one second layer and at least one third layer independently being made of a polymer other than the polymer nanocomposite of the core layer, and where the adjacent layers are attached.

In some embodiments the core, second, or third layers, or combinations thereof contain metal oxide particles.

In embodiments, the at least one second layer and the at least one third layer may independently be of a polymer selected from polyolefins, polyamides, and copolymers and combinations thereof, and in some embodiments the polyolefins and polyamides may be low density polyethylene, polypropylene, Nylon 6, Nylon 6,6, MXD6 Nylon, ethylene vinyl acetate, and copolymers and mixtures thereof.

In some embodiments the core layer, second layer, and third layer may independently include one or more adjacent layers of the same polymer or polymer nanocomposite.

In embodiments, the core layer may be up to about 10 mils thick, and in others, the core layer may be up to about 2 mils thick. The second layer and third layer may be independently up to about 4 mils thick in embodiments.

In some embodiment, the multi-layer barrier film may further include one or more adhesive layers of ethylene methacrylic acid, ethylene acrylic acid, maleic anhydride modified polyolefin polymer, ethylene vinyl acetate, and combinations thereof.

In certain embodiments, at least one of one of the second layer and third layer may be flame resistant, and in other embodiments, the multi-layer barrier film or laminate have an afterflame of at least less than about 5 sec as determined using a ASTM D6413 method. In still other embodiments, the multi-layer barrier film or laminate may have an afterflame of at least less than about 2 sec as determined using an ASTM D6413 method, and in some embodiments, the multi-layer barrier film or laminate may be non-dripping.

In embodiments, the second layer and third layer may further include one or more additives such as at least one flame retardant, at least one anti-dripping agent, at least one antioxidant, at least one pigment, colorant, or dye, and combinations thereof, and in certain embodiments, the flame retardant is selected from clay, silicate clays, modified clays, antimony oxide, antimony trioxide, arsenic, octadecanoic acid, aluminum salt, aluminum tristerate, lead oxide, 1H-isoindole-1,3(2H)-dione,2,2'-(1,2-ethanediyl)BIS(4,5,6,7-tetrabromo) chlorinated parrafins, halogenated flame retardants, phosphorous based flame retardants, and combinations thereof.

In particular embodiments, the multi-layer barrier film or laminate may further include one or more material layers laminated between the core layer and the second layer, third layer, or both the second and third layers of the multi-layer barrier film or laminate or one or more material layers applied to an upper surface, a lower surface, or both an upper and a lower surface of the multi-layer barrier film or laminate or both.

The material layers of embodiments may be fabrics, scrims, woven or non-woven polymeric fibers, woven or non-woven polyolefin tape or fibers, woven slit film fabric and combinations thereof, said polymeric fibers selected from polyester, nylon, KEVLAR®, nomex, and combinations thereof, and said woven slit film comprising polyethylene, high density polyethylene (HDPE), polypropylene, and combinations thereof.

In some embodiments, the multi-layer barrier film or laminate may have a chemical agent breakthrough that is prevented for greater than about 72 hours as per the TOP-8-2-501 method and may be used for the liner for a tent or protective clothing.

The invention also includes a method for preparing a multi-layer barrier film or laminate including providing a core layer comprising one or more layers of a polymer nanocomposite of ethylene vinyl alcohol and silica particles or metal oxide particles having an upper surface and a lower surface, said polymer nanocomposite comprising, and coating the upper surface of the core layer with at least one second layer and coating the lower surface of the core layer with at least one third layer to make a multi-layer barrier film or laminate wherein the second and third layers may independently be of a polymer other than the polymer nanocomposite of the core layer. In some embodiments, the method may further include laminating one or more fabric layer between the core layer and the at least one second layer, at least one third layer, or both the at least one second and the at least one third layers of the multi-layer barrier film or applying one or more fabric layer to an upper surface, a lower surface, or both an upper and a lower surface of the multi-layer barrier film or laminate or both laminating and applying.

The multi-layer barrier film laminate of embodiments may include a multi-layer barrier film having at least one core polymer nanocomposite layer of ethylene vinyl alcohol and silica particles having an upper and a lower surface, said polymer nanocomposite layer comprising, at least one second layer adjacent to the upper surface of the polymer nanocomposite layer and at least one third layer adjacent to the lower surface of the polymer nanocomposite layer, where the second and third layers may independently be of a polymer other than ethylene vinyl alcohol, and one or more material layers laminated to an outer surface of the multi-layer barrier film laminate, an inner surface of the multi-layer barrier film laminate, both an outer and an inner surface of the multi-layer barrier film laminate, between the polymer nanocomposite layer and the second layer or the third layer, and combinations thereof.

In certain embodiments, the second layer, third layer, or both the second and third layers may have a flame retardant. In some embodiments, the material layers may be of fabrics, scrims, woven or non-woven polymeric fibers, woven or non-woven polyolefin tape or fibers, woven slit film fabric and combinations thereof where polymeric fibers may be polyester, nylon, KEVLAR®, nomex, and combinations thereof, and said woven slit film comprising polyethylene, high density polyethylene (HDPE), polypropylene, and combinations thereof.

In some embodiments, the multi-layer barrier film laminate may further include one or more adhesive layers where the adhesive layers effect adhesion of the at least one second layer and at least one third layer to the core layer, and in other embodiments, the adhesive layer may be of an adhesive selected from ethylene methacrylic acid, ethylene acrylic acid, maleic anhydride modified polyolefin polymer, ethylene vinyl acetate, and combinations thereof.

The multi-layer barrier film laminate of embodiments may be used for the liner of a tent or protective clothing or may be used as the outer shell of a tent.

In embodiments the multi-layer barrier film or laminate may have an after flame of at least less than about 5 sec as determined using an ASTM D6413 method, and may prevent chemical agent breakthrough for greater than about 72 hours as determined using a TOP-8-2-501 method.

BRIEF DESCRIPTION OF THE DRAWINGS

For a fuller understanding of the nature and advantages of the present invention, reference should be made to the following detailed description taken in connection with the accompanying drawings, in which.

DETAILED DESCRIPTION

Before the present embodiments, methods, and materials are described, it is to be understood that this disclosure is not limited to the particular embodiments, methodologies, and materials described, as these may vary. It is also to be understood that the terminology used in the description is for the purpose of describing the particular embodiments only, and is not intended to limit the scope.

It must also be noted that as used herein and in the appended claims, the singular forms "a," "an," and "the" include plural references unless the context clearly dictates otherwise. Unless defined otherwise herein, all technical and scientific terms used herein have the same meanings as commonly understood by one of ordinary skill in the art. Nothing herein is to be construed as an admission that the embodiments disclosed herein are not entitled to antedate such disclosure by virtue of prior invention.

A "barrier" as used herein shall mean a material or a material structure such as a film, layer, membrane or surface coating which prevents the penetration or permeation of vapors or gases through or beyond the material or material structure acting as the barrier. Barriers may be "selective" meaning that the barrier prevents one or more specific vapors or gases from penetrating or permeating the barrier, or "non-selective", meaning that the barrier prevents penetration or permeation of a number of vapors or gases. Examples of selective barriers include a water vapor or moisture barrier that prevents penetration or permeation of a barrier by water vapor, an oxygen barrier that prevents penetration of a barrier by oxygen, such as, oxygen contained in the atmosphere, and a flavor or aroma barrier that prevents penetration or permeation of a barrier by complex organic molecules that impart flavor or aroma. In general, a barrier may act to prevent penetration or permeation by vapors or gases because of certain physical or chemical properties possessed by the barrier.

A "nanocomposite" or a "polymer nanocomposite" as used herein shall mean monomers, polymers, oligomers, or copolymers having inorganic (or organically modified inorganic) particles, such as, for example, metal oxide or silica particles dispersed within the monomer or polymer.

A "core" or "core layer" as used herein shall mean an interior layer of a multi-layer film wherein one or more layers are present on either side of the core layer. The layers of a multi-layer film may be arranged symmetrically or asymmetrically.

A "laminate" as used herein shall mean a multi-layer structure prepared by coating and laminating one or more layers onto a film or fabric substrate.

A "polymer" or "polymer resin" may include but are not limited to, homopolymers, copolymers, such as, for example, block, graft, random and alternating copolymers, terpolymers, and the like, as well as blends, co-polymers, mixtures, and modifications thereof. Polymers or polymer resins shall also include all possible molecular configurations of a polymeric material including, but not limited to, isotactic, syndiotactic, and random molecular configurations.

"Polyethylene" as used herein shall mean a resin obtained by substantially polymerizing ethylene. Polyethylenes may include low density polyethylenes (LDPE), medium density polyethylenes (MDPE), linear low density polyethylenes (LLDPE) and high density polyethylenes (HDPE), and a wide range of properties such as density, melt index, crystallinity, degree of branching, molecular weight and molecular weight distribution can be modified by varying the number and type of co-monomers, catalyst and methods of polymerization.

"Ethylene vinyl acetate copolymer" or "EVA" as used herein shall mean a copolymer formed from ethylene and vinyl acetate monomers.

"Ethylene vinyl alcohol copolymer" or "EVOH" as used herein shall mean a copolymer formed by the hydrolysis of polyethylene vinyl acetate.

"Polyolefins" as used herein shall mean polymers of olefins, such as, for example, ethylene, propylene, butenes, isoprenes, pentenes, and the like, and may include, but not be limited to, homopolymers, copolymers, blends, mixtures, and modified olefins.

"Polyamide" as used herein shall mean a polymer having repeating units of one or more amide groups (HN—CO), such as, for example, poly(hexamethylene sebacamide), poly(hexamethylene adipamide), poly(-caprolactam) and poly(m-xyleneadipamide), nylon, and copolymers of these. Examples of copolymers of nylons may include a copolymer of Nylon 6 and Nylon 6,6, also known as Nylon-6,10, Nylon 6,6, Nylon-6, MXD6, and Nylon 6/6,6.

A "tie resin" or "tie layer" as used herein shall mean an adhesive having an affinity for polymeric materials that is meant to adhere to or bind together polymeric materials. Typically, tie resins are used in coextrusion or extrusion lamination and are polyolefin type copolymers, such as, for example, ethylene vinyl acetate (EVA), acid-modified EVA, ethylene acrylic acid (EAA), ethylene methacrylic acid (EMA), ethylene/acrylate copolymers and the like, and maleic anhydride modified polyolefin polymer such as, for example, PLEXAR® from Equistar and BYNEL® from DuPont.

The invention described herein generally relates to polymer nanocomposites, methods for making polymer nanocomposites, multi-layer barrier films containing at least one layer including a polymer nanocomposite, and flame retardant multi-layer barrier films and laminated fabrics containing at least one layer including a polymer nanocomposite.

The polymer nanocomposite of the invention includes polymer and particles that may be either silica particles and/or non-platelet metal oxide particles and may be a single layer or present as one or more layers in a multi-layer barrier film. In general, the polymer nanocomposites and multi-layer barrier films including such polymer nanocomposites provide a barrier to gaseous species, such as, but not limited to, oxygen, carbon dioxide, water vapor and toxins, industrial chemicals, chemical warfare agents, infectious agents, biological warfare agents, and the like.

In some embodiments, the silica of the polymer nanocomposite may be silica or fumed silica, such as, for example, AEROSIL® 300 fumed silica, and in other embodiments, the non-platelet metal oxide particles (metal oxide particles) may be particles of any metal oxide capable of being dispersed in a polymer to produce a polymer nanocomposite, such as, for example, alumina, titania, ceria, iron oxide, magnesium oxides (MgO), zinc oxides (ZnO), calcium oxides (CaO), cerium oxides (CeO), and combinations of these.

The silica or non-platelet metal oxide particles, generally, may be substantially spherical having a diameter of up to about 500 nm, and in certain embodiments, the silica or metal oxide particles may have a diameter of from about 7 nm to about 200 nm. The surface area of the silica or metal oxide particles may vary depending on the composition and size of the particles, and silica or metal oxide particles having any surface area may be used. However in some embodiments, the surface area of the silica or metal oxide particles may be greater than about 50 $m^2/g$. Silica or metal oxide particles that have a high concentration such as, for example, a concentration of surface hydroxyl groups of greater than about 2 $nm^{-2}$ may be used in the polymer nanocomposites of the invention. Without wishing to be bound by theory, surface hydroxyl groups of silica or metal oxide particles may allow these particles to bind with the polymer more efficiently. Therefore, silica or metal oxide particles having a higher concentration of hydroxyl groups may bind to a polymer, such as, EVOH, better.

The silica particles or metal oxide particles of embodiments may be randomly distributed throughout the polymer and may make up to about 5 wt % of the total polymer nanocomposite. However, without wishing to be bound by theory, increasing the concentration of silica or metal oxide particles in a polymer nanocomposite may improve barrier properties of the polymer nanocomposite. Therefore, in some embodiments, the concentration of silica or metal oxide particles in a polymer nanocomposite may be greater than about 5 wt %.

In embodiments, silica or metal oxide particles may be present individually or in combination in a polymer nanocomposite and may provide a passive and/or an active barrier to permeants. By a passive barrier to the permeants, is meant that the particles physically block the traversal of a permeant through a polymer nanocomposite. Without wishing to be bound by theory, silica and metal oxide particles may achieve improved passive barrier properties by reducing the free volume of a polymer nanocomposite by occupying free space or voids within the polymer and physically filling these voids. Permeants that traverse a barrier film by inhabiting these voids may, therefore, be prohibited from traversing the film. The silica and metal oxide particles may also reduce segmental motion in a polymer by forming strong hydrogen bonds between surface hydroxyl groups of the silica or metal oxide particles and polymer chains hindering polymer chain rearrangement and/or reducing mobility of void space within the polymer and trapping permeants that may enter the polymer nanocomposite in a void before the permeant can traverse the polymer nanocomposite barrier. Silica or metal oxide particles may also provide an active barrier to permeants meaning that the silica or metal oxide particles may physically or chemically interact with a permeant and/or adsorb or chemically destroy it thereby stopping permeants from traversing the polymer nanocomposite barrier.

The polymer in the polymer nanocomposite may be any polymer known in the art including, but not limited to, polyolefins, polyamides, and combinations thereof, and in certain embodiments, the polymer may be ethylene vinyl alcohol (EVOH). In general, an EVOH polymer or co-polymer may include random copolymers of ethylene and vinyl alcohol units, and the EVOH may be any EVOH polymer or EVOH co-polymer known in the art. The ethylene and vinyl alcohol units of embodiments may be in any proportion, such as, for example, from about 5 mol % to about 95 mol % ethylene and from about 95 mol % to about 5 mol % vinyl alcohol, respectively, or from about 25 mol % to about 45 mol % ethylene and about 75 mol % to about 55 mol % vinyl alcohol, respectively. In some embodiments, commercially available EVOH polymers or co-polymers, such as, for example, EVAL® 105, F151B, E105, E171B, and F171B EVOH polymers may be used. In still other embodiments, additional properties may be obtained by adding to a polymer nanocomposite, for example, one or more additives, such as, fire retardants, anti-dripping agents, antioxidants, pigments, colorants, dyes, and combinations of these.

Polymer nanocomposites may be prepared by any method known in the art. For example, silica or metal oxide particles may be dispersed into the polymer by compounding, melt mixing, or extrusion; the polymer may be dissolved and silica or metal oxide particles may be dispersed into the dissolved polymer; or silica and/or metal oxide particles may be incorporated into a polymer by in situ polymerization.

In some embodiments, a polymer nanocomposite may be prepared by providing a polymer and compounding silica and/or metal oxide particles into the polymer. In such embodiments, silica or metal oxide particles may be in any form available, such as, for example, a dry powder or agglomerates, and compounding may occur using any technique, method, mechanism, and/or apparatus known in the art. For example, silica or metal oxide particles may be mixed with an EVOH polymer in a melt phase via extrusion using a single or twin screw extruder. The melt phase temperature of an EVOH polymer to which silica or metal oxide particles may range from between about 165° C. to about 225° C. However in certain embodiments, metal oxide particles may be mixed with EVOH polymers via extrusion at temperatures below a melt temperature of the EVOH, such as, for example, between about 140° C. to about 165° C. Without wishing to be bound by theory, lower temperature extrusion or processing may prevent polymer degradation and limit loss of particular properties of the polymer, such as, for example, in the case of EVOH, a color change, during compounding steps.

In other embodiments, a polymer nanocomposite may be prepared by providing a polymer, dissolving the polymer with at least one solvent, dispersing silica and/or metal oxide particles in the dissolved polymer, and removing the solvent to make the polymer nanocomposite. In such embodiments, the solvent used may be any solvent known in the art to dissolve a particular polymer. Examples of solvents may include, but not be limited to, aromatic solvents, such as, for example, benzene, toluene, xylene, phenol, and the like, and halogenated solvents, such as, for example, dichloromethane and the like. Silica or metal oxide particles may be dispersed using any method known in the art, such as, mechanical mixing or blending and the like, and the removal of the solvent following dispersion may occur at ambient temperature or may be facilitated by heating the silica or metal oxide dissolved polymer mixture.

In still other embodiments, a polymer nanocomposite may be prepared using in situ methods. As used herein, an in situ method may include incorporating silica or metal oxide particles into monomers or precursors of a polymer, and these monomers or precursors may be further processed to make the polymer nanocomposite. For example, silica or metal oxide particles may be incorporated into an EVOH precursor, such as, for example, ethylene vinyl acetate, and the EVOH precursor/metal oxide may then be hydrolyzed by methods known in the art to form a polymer nanocomposite.

Following preparation of a polymer nanocomposite, the polymer nanocomposite may be formed by any method known in the art, such as, for example, extrusion, rolling, molding, blown film, cast film, blow molding or combination thereof. For example in some embodiments, film sheets of an EVOH polymer nanocomposite having silica and/or metal oxide particles may be formed by blown film or cast film, and in other embodiments, polymer nanocomposite film sheets may be laminated to form a barrier film having more than one EVOH polymer nanocomposite film layer. In still other embodiments, polymer nanocomposite film sheets or the polymer nanocomposite may be molded into an article of manufacture, such as, for example, a food storage container or bottle or pharmaceutical packaging. The thickness of a polymer nanocomposite film sheet or molded article of a polymer nanocomposite article may be up to about 10 mils, or up to about 2 mils or from about 0.5 mils to about 2 mils depending upon the application for which the polymer nanocomposite is used. Without wishing to be bound by theory, the barrier properties of a polymer nanocomposite may be improved as the thickness of the polymer nanocomposite is increased. Therefore, a polymer nanocomposite that may be used in applications that require greater barrier properties, for example, a polymer nanocomposite sheet or film for use to protect against a chemical warfare agent attack, may be thicker than a polymer nanocomposite that is used to provide a barrier to aroma and flavor gases for food stuffs.

In some embodiments, polymer nanocomposite or polymer nanocomposite film may make up a core layer and may be combined with one or more polymer layers of a polymer other than the polymer of the polymer nanocomposite to make a multi-layer polymer film. For example, an EVOH polymer nanocomposite may be used as a core layer in a multi-layer barrier film that is bound on one or both sides by one or more polymer layers of, for example, a polyolefin other than EVOH, a polyamide, or combination of these. A multi-layer barrier laminate may also be made up of a polymer nanocomposite layer and one or more material or fabric layers, or a multi-layer barrier film and one or more material or fabric layers. For example, an EVOH polymer nanocomposite may be co-extruded with one or more different polymeric materials to form a multi-layer barrier film that includes one or more core polymer nanocomposite layers and one or more polymer layers, and this multi-layer barrier film may be combined with one or more fabric layers to produce a multi-layer barrier laminate. Polymer layers and fabric layers may generally have a thickness of up to about 4 mils, but for some applications, the thickness of the polymer layer or fabric layer may be greater than about 4 mils.

In embodiments, layers of a multi-layer barrier film may be adhesively attached to one another by tie layers or adhesive layers found between the core, polymer, and material layers. An adhesive layer may be made up of any material, such as, for example, ethylene methacrylic acid, ethylene acrylic acid, maleic anhydride modified polyolefin polymer, ethylene vinyl acetate, anhydride modified ethylene vinyl acetate, ethylene acrylate copolymers, and combinations of these.

In some embodiments, the multi-layer film and the fabric substrate may be attached to one another using an adhesive made up of any material, such as, for example, ethylene methacrylic acid, ethylene acrylic acid, maleic anhydride modified polyolefin polymer, ethylene vinyl acetate, anhydride modified ethylene vinyl acetate, ethylene acrylate copolymers, and combinations of these or by applying heat and pressure to the layered barrier film allowing the layers to bond without an adhesive layer.

Figure 1:
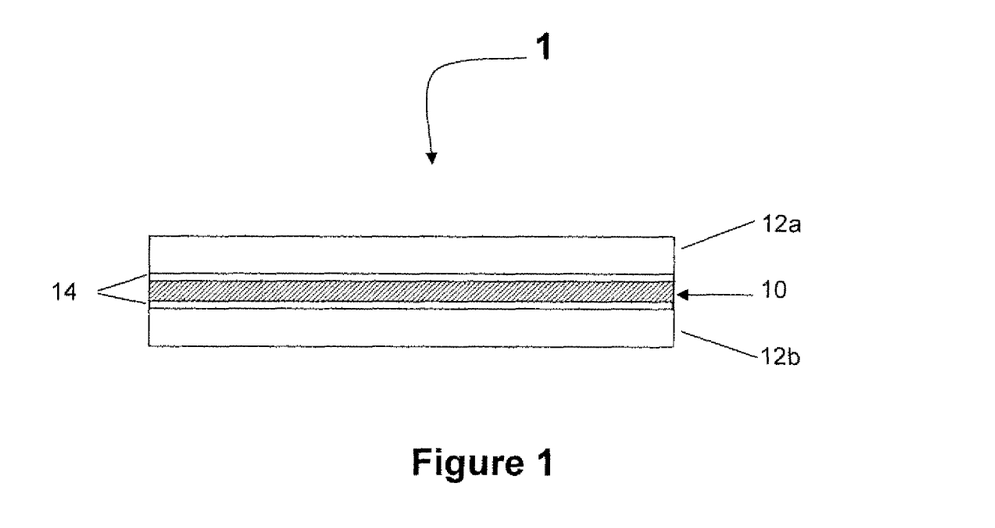
FIG. 1 illustrates an embodiment of a multi-layer barrier film.

The layers of a multiple layer barrier film may be arranged in any order. For example a multi-layer barrier film 1 as illustrated in FIG. 1, includes a polymer nanocomposite 10 bound on either side by polymeric layers 12a and 12b, and attached by adhesive layers 14. The multi-layer barrier film therefore has a total of five layers.

Figure 2:
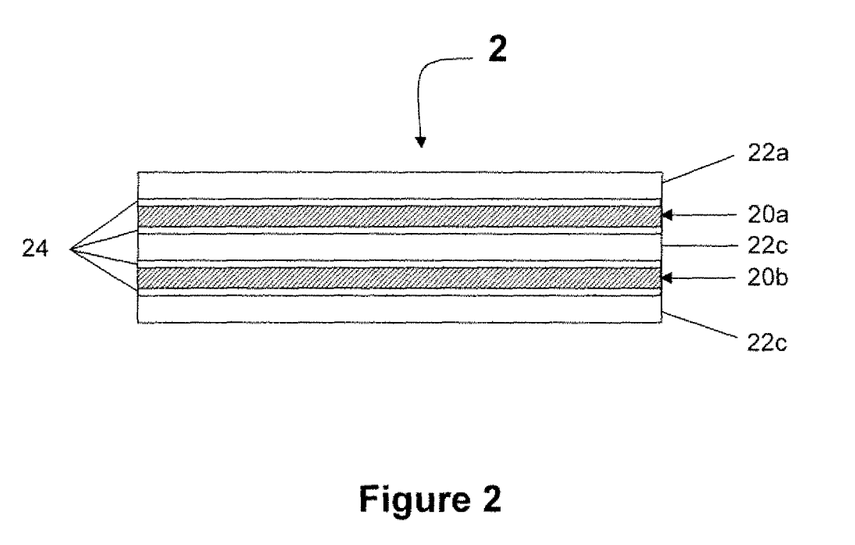
FIG. 2 illustrates another embodiment of a multi-layer barrier film.

In another embodiment, the multi-layer barrier film 2 as illustrated in FIG. 2, more than one polymer nanocomposite film layers 20a and 20b is interspersed between multiple polymer layers 22a, 22b, and 22c, and these layers are attached by adhesive layers 24, to provide a multi-layer barrier film having nine layers. In various embodiments, any number of layers may be present, for example, a multi-layer barrier film may have less than 5 or greater than 5 layers.

In certain embodiments, one or more polymer layers or tie layers of a multi-layer barrier film may have incorporated one or more additives that impart particular properties into the multilayer barrier film. In particular, additives may provide polymer layers with one or more specific properties including, but not limited to, flame retardancy, color, UV protection, and the like, by providing additives, such as, for example, flame retardants, anti-dripping agents, anti-oxidants, curing agents, pigments, dyes, colorants, and the like. For example, a core EVOH polymer nanocomposite may be bound on either side by flame retardant polyolefin polymer layers, or a core EVOH polymer nanocomposite may be bound on either side by a flame retardant polyolefin in polymer layer and a flame retardant tie layer. The flame retardant provided in the intermediate or tie layers may include, but not be limited to, clays, modified clays, silicate clays, antimony oxide, antimony trioxide, arsenic, octadecanoic acid, aluminum salt, aluminum tristreate, lead oxide, 1H-isoindole-1,3(2H)-dione,2,2'-(1,2-ethanediyl)BIS(4,5,6,7-tetrabromo) chlorinated parafins, halogenated flame retardant, phosphorous based flame retardant compounds and Nochar's Fire Presenter. Without wishing to be bound by theory, the presence of silicate or metal oxide particles may provide flame resistant properties to a multi-layer barrier film through the formation of a thermally protective char which may lead to a substantial reduction in the total heat release, reduced polymer drip, and burn rate upon ignition.

Figure 3A:
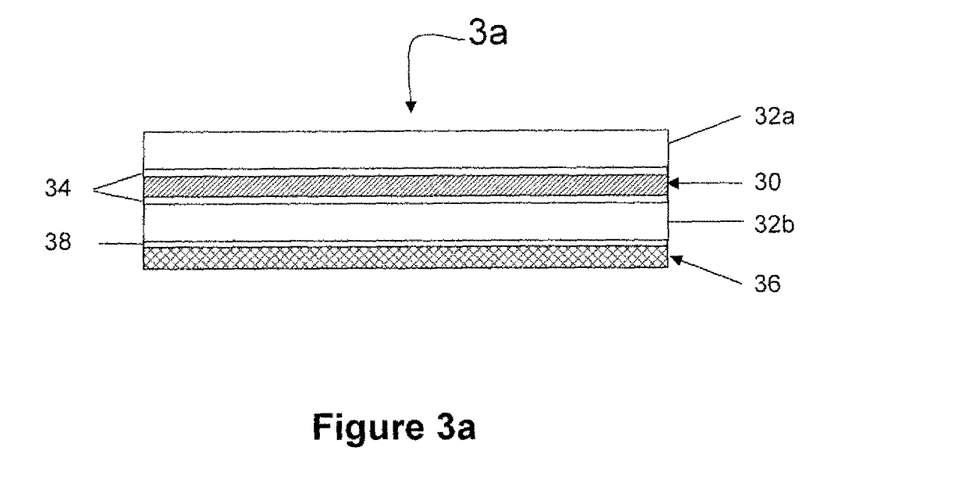
FIG. 3 illustrates another embodiment of a multi-layer barrier laminate.
Figure 3B:
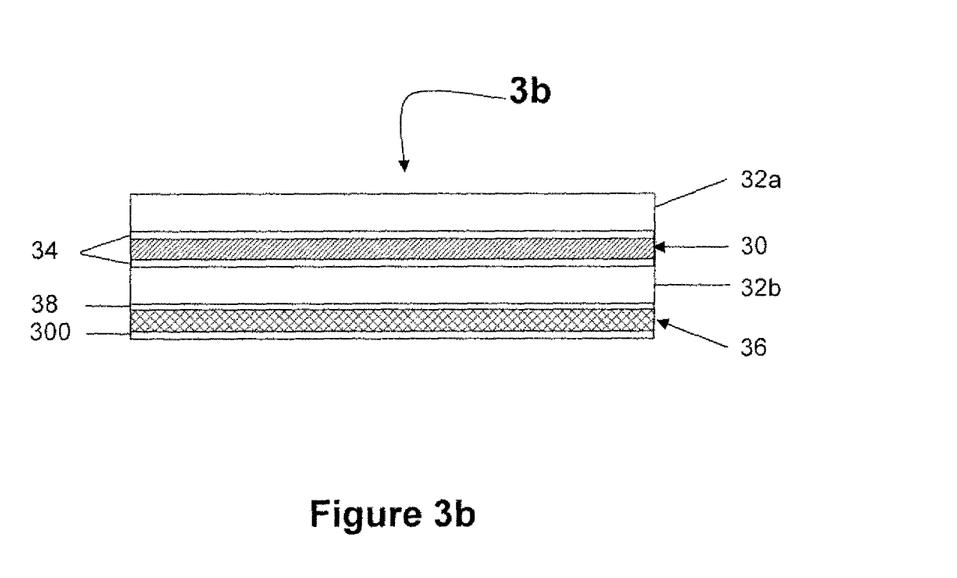
Figure 4:
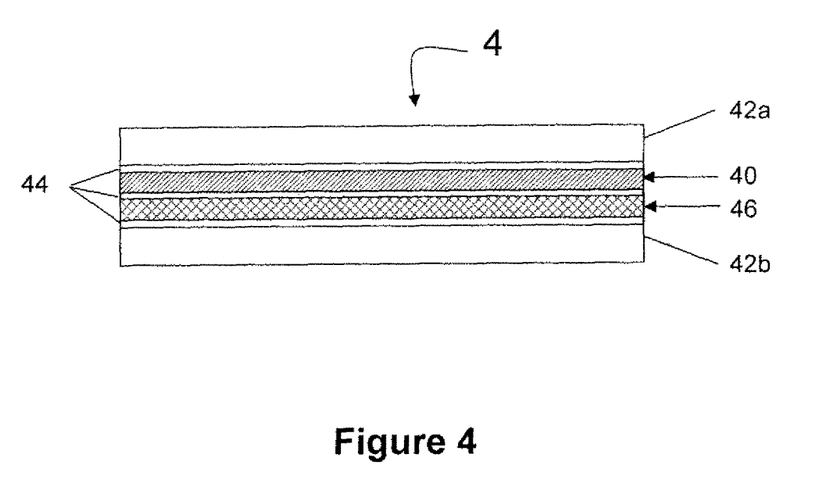
FIG. 4 illustrates another embodiment of a multi-layer barrier laminate.

In some embodiments, a multi-layer barrier film may have one or more material layers applied to one or more outermost surfaces of the multi-layer barrier film, laminated between any of the layers in a multi-layer barrier film, or both between layers of the multi-layer barrier film and on one or more of an outermost surface of the multi-layer barrier film. A material layer may be made up of a fabric, a scrim, or woven or non-woven polymeric fibers including, but not limited to polyolefin tape or fibers, polyester, nylon, KEVLAR®, HDPE, nomex, and combinations of these, and in certain embodiments, the material layer may be made up of low density polyethylene (LDPE), polypropylene, Nylon 6, Nylon 6,6, MXD6 Nylon, or EVA. For example in some embodiments, a multi-layer barrier film 3a including a fabric layer may be arranged as illustrated in FIG. 3a: a core polymer nanocomposite layer 30 may be bound on either side by polymer layers 32a and 32b which are attached to each other by adhesive layers 34, and a fabric layer 36 may be attached to one side of the multi-layer barrier film by another adhesive layer 38. In other embodiments of a multi-layer barrier film 3b, as illustrated in FIG. 3b, the fabric layer may be further coated with a polymer layer 300. Examples of other embodiments of multi-layer barrier films 4 are illustrated in FIG. 4: a core polymer nanocomposite layer 40 may be bound on either side by polymer layers 42a and 42b which are attached to each other by adhesive layers 44 and a fabric layer 46 may be laminated between the core and polymer layer.

In certain embodiments, the multi-layer barrier laminate may have a polymer nanocomposite core of EVOH and silica particles that is coated on either side with a flame retardant polyolefin and laminated with a material layer of LDPE, and the material layer may be coated with another flame retardant polyolefin layer.

Multi-layer barrier films and multi-layer laminates of embodiments may be prepared using any method known in the art. For example, a multi-layer barrier film may be prepared as described above by co-extrusion or blown film layers of core and polymer layers which may be combined using adhesive layers. A material layer of, for example, fabric, may then be coated with an adhesive layer polymer and this layer may be applied to one or more of the outer layers of the multi-layer barrier film. In various embodiments, an additive, such as a flame retardant, may be present in any or all of the core layer, polymer layers or the material layer.

In embodiments, the multilayer barrier film or multi-layer laminate may provide a flame resistant barrier to gaseous species, such as, oxygen and water vapor, and industrial chemicals, chemical warfare agents, biological warfare agents, and toxins. For example, the multi-layer barrier film and/or multilayer laminate may provide greater than 72 hours of protection before chemical break through as determined using TOP-8-2-501, and may provide an after flame of less than 2 seconds as measured by ASTM D6413 or have a V-0 rating as measured by UL-94 VTM, and in certain embodiments, the multilayer barrier film or laminate may be non-drip. TOP-8-2-501, UL-94 VTM and ASTM D6413 are methods well known in the art and are briefly described below.

TOP-8-2-501 is a test for the permeation and penetration of air-permeable, semipermeable, and impermeable agents to chemical agents wherein static diffusion is used to test impermeable or semipermeable materials for their ability to resist diffusive penetration of chemical agents placed on the material as liquid droplets while preventing air from passing across the droplets. Briefly, the upper side of the test swatch having an exposed surface area of 11.3 cm$^2$ is contaminated with 10 g/m$^2$ of the selected agent as a liquid drop, and the swatch is loaded into a test cell. An upper cell compartment is sealed to prevent air from entering the top of the test cell while conditioned air is drawn through a lower cell compartment at 1 L/min across the lower surface of the swatch. Samples of the effluent air from the lower cell compartment then are taken at various times and analyzed to measure the amount of chemical agent penetrating the lower cell compartment as a function of time. For example, an air sample may be taken at 5 minutes post-contamination and then every hour thereafter for a total of 96 hours.

UL-94 VTM is a test used to determine the flame resistance characteristics of very thin, less than 10 mils, materials or very flexible materials that may distort, shrink or flex during the test. Briefly, a swath of the test fabric is wrapped around a mandrel and taped at one end to form a cone. The lower end is subjected to two flame applications of 3 secs each. The materials are classified as V-0, V-1 or V-2 based on their after flame, the time the swath continues to burn after removal of the flame, and dripping characteristics.

ASTM D6413 is a test used to measure the vertical flame resistance of textiles. Briefly, a swath of a test fabric is positioned vertically above a controlled flame and exposed to the flame for 12 secs. The flame is then removed and the after flame and after glow, the time the specimen continues to glow after the flame is removed, are determined. A specified force is then applied to the tested fabric sample and the char length, the length of the burnt portion of the specimen after application of force, is measured. Any evidence of dripping or melting of the swath is also noted.

The multilayer barrier films or multi-layer laminate of embodiments may be used for a variety of purposes including, for example, packaging oxygen sensitive food and beverages, pharmaceutical packaging, providing a protective barrier to industrial chemicals, providing a protective barrier to chemical and biological warfare agents, chemical and biological weapons, and other toxins. In certain embodiments, the multi-layer laminate may be used as a liner for protective tents and or protective clothing. In particular, the multi-layer barrier films and multi-layer laminate containing polymer nanocomposites of embodiments may provide a significant passive and active barrier to chemical and biological agents, as well as industrial chemicals and may provide at least about 72 hours of protection as determined using the TOP-8-2-501 test against such agents.

The multi-layer barrier films and laminates described herein may, generally, provide improved barrier properties over other EVOH resins that do not contain silica or metal oxide particles at any thickness. In other words, the multi-layer barrier film of embodiments can achieve any standard set for barrier properties of a multi-layer barrier film while providing a core layer that is less thick than other EVOH resins. Thus, the multi-layer films or laminates described herein may be more light weight or be fitted with additional polymer or material layers to improve durability.

This invention and embodiments illustrating the method and materials used may be further understood by reference to the following non-limiting examples.

EXAMPLE 1

Table 1 shows oxygen and water vapor permeation test results for three multi-layer barrier films: Film 1 is an EVOH film of F178B EVOH; Film 2 is a polymer nanocomposite of the EVOH film and CLOISITE® 93A layered alumino-silicate particles purchased from Southern Clay Products located in Gonzales, Tex.; and Film 3 is a polymer nanocomposite of EVOH and AEROSIL® 300 fumed silica particles from Degussa Corp. Each film has outer layers of Huntsman 1031S grade polyethylene. Films 2 and 3 show improved barrier properties to both oxygen (OTR) and moisture (MVTR).

TABLE 1

| Film | Thickness (mils) | Wt % particles | OTR | MVTR |
|---|---|---|---|---|
| 1 | 8.2 | — | 0.00336 | 0.05188 |
| 2 | 9.0 | 1.5 | 0.00224 | 0.05848 |
| 3 | 8.2 | 1 | 0.00211 | 0.04495 |

Permeation of oxygen (OTR) through the film was measured using a MOCON® OX-TRAN® 2/21 apparatus sold by Mocon Inc, MN. In this method, a sample of a flat film is clamped into a diffusion cell in the apparatus, and pure (99.9%) oxygen is introduced into the outside chamber of the diffusion cell. Molecules of oxygen that diffuse through the film to the inside chamber are conveyed to the sensor by a carrier gas and the permeation of oxygen is determined using data so acquired. With regard to the water vapor test results (MVTR), the films were exposed to a temperature of 37.5° C. at about 90% relative humidity. A MOCON® 2/61 OX-TRAN® or MOCON® 2/21 OX-TRAN® were used for these tests.

Permeation of water vapor (MVTR) through the film was measured using a MOCON® PERMATRAN-W® 3/33 instrument sold by Mocon Inc, MN. In this method, a sample of flat film is clamped into the diffusion cell, and humid air or distilled water is introduced to the outside chamber of the diffusion cell. Molecules of water diffusing through the film to the inside chamber are conveyed to the sensor by a carrier gas. A computer monitors the increase in water vapor concentration in the carrier gas and reports that value on the screen as the water vapor transmission rate.

EXAMPLE 2

Table 2 shows oxygen and water vapor permeation test results for films having an increasing concentration of silica particles. Film 1 is an EVOH only film of F178B EVOH, and Films 2-4 are polymer nanocomposites of EVOH and AEROSIL® 300 fumed silica particles from Degussa Corp. Each film has outer layers of Huntsman 1031S grade polyethylene.

TABLE 2

| Film | Thickness (mils) | Wt % particles | OTR | MVTR |
|---|---|---|---|---|
| 1 | 5.0 | — | 0.0080 | 0.101 |
| 2 | 5.0 | 0.5 | 0.0048 | 0.102 |
| 3 | 5.0 | 1.0 | ND | 0.116 |
| 4 | 5.0 | 1.7 | ND | 0.116 |

ND indicates "Not Detected" after 48 hours

EXAMPLE 3

Table 3 shows the flame resistant properties of a multi-layer laminate as determined using the ASTM D6413 test. The multi-layer barrier films of described below are of five layers having a core (TBF) consisting of an EVOH nanocomposite of F171B EVOH with 1.5 wt % silica (AEROSIL® 300). Polymer layers (T) of 1.5 mil thick film of flame retardant LDPE consisting of 23 wt % of 101199 LDPE/FR Masterbatch from Ampacet Corp, and fabric layers of 10×10 slit film woven HDPE fabric either from FABRENE® ($S_f$) or Maiweave ($S_M$). All of the films tested show good flame retardancy.

TABLE 3

| Liner # | Configuration | After Flame, secs | AfterGlow, secs | Char Length, inch |
|---|---|---|---|---|
| 1 | TBF 3/T/$S_f$/T | 0 | 0 | 4.35 |
| 2 | TBF 7/T/$S_f$/T | 0 | 0 | 4 |
| 3 | TBF 9/T/$S_f$/T | 0 | 0 | 4.45 |
| 4 | TBF 3/$S_M$/T | 0 | 0 | 4.25 |
| 5 | TBF 13/T/$S_M$/T | 0 | 0 | 5.33 |
| 6 | TBF 18/T/$S_M$/T | 0 | 0 | 3.5 |

It will be appreciated that variations of the above-disclosed and other features and functions, or alternatives thereof may be desirably combined into many other different systems or applications. Also, that various presently unforeseen or unanticipated alternatives, modifications, variations or improvements therein may be subsequently made by those skilled in the art that are also intended to be encompassed by the following claims.

Although the present invention has been described in considerable detail with reference to certain preferred embodiments thereof, other versions are possible. Therefore the spirit and scope of the appended claims should not be limited to the description and the preferred versions contained within this specification.

What is claimed is:

1. A polymer nanocomposite comprising, ethylene vinyl alcohol having from about 5 mol % to about 95 mol % ethylene, and substantially spherical silica particles, wherein the particles are about 1 nm to about 500 nm in diameter and about 0.5 wt % to about 2 wt % of the total polymer nanocomposite, wherein the polymer nanocomposite includes no organosilane, and wherein said polymer nanocomposite is a cast or blown film up to about 10 mils thick.

2. The polymer nanocomposite of claim 1, wherein the particles have a surface area of greater than about 50 m²/g.

3. The polymer nanocomposite of claim 1, wherein the particles have surface hydroxyl groups at a concentration greater than about 2 nm$^{-2}$.

4. The polymer nanocomposite of claim 1, wherein the particles are dispersed throughout the ethylene vinyl alcohol.

5. The polymer nanocomposite of claim 1, wherein the polymer nanocomposite provides a barrier against oxygen, carbon dioxide, water vapor, chemicals, and combinations thereof.

6. A barrier film comprising one or more layers of a polymer nanocomposite, said polymer nanocomposite comprising, ethylene vinyl alcohol having from about 5 mol % to about 95 mol % ethylene, and substantially spherical silica particles, wherein the particles are about 1 nm to about 500 nm in diameter and about 0.5 wt % to about 2 wt % of the total polymer nanocomposite, wherein the polymer nanocomposite includes no organosilane, and wherein said barrier film is a cast or blown film up to about 10 mils thick.

7. The barrier film of claim 6, wherein the barrier film is up to about 2 mils thick.

8. A multi-layer barrier film comprising:
at least one core layer of a polymer nanocomposite having an upper surface and a lower surface, said polymer nanocomposite comprising, ethylene vinyl alcohol having from about 5 mol % to about 95 mol % ethylene, and substantially spherical silica particles, wherein the particles are about 1 nm to about 500 nm in diameter and about 0.5 wt % to about 2 wt % of the total polymer nanocomposite, wherein the polymer nanocomposite includes no organosilane, and wherein said core layer is a cast or blown film up to about 10 mils thick; and
at least one second layer adjacent to the upper surface of the at least one core layer; and
at least one third layer adjacent to the lower surface of the at least one core layer;
wherein said at least one second layer and at least one third layer are independently comprised of a polymer other than the polymer nanocomposite of the core layer; and
wherein adjacent layers are attached.

9. The multi-layer barrier film of claim 8, wherein the at least one second layer and the at least one third layer independently comprise a polymer selected from polyolefins, polyamides, and copolymers and combinations thereof.

10. The multi-layer barrier film of claim 9, wherein the polyolefins and polyamides are selected from low density polyethylene, polypropylene, Nylon 6, Nylon 6,6, MXD6 Nylon, ethylene vinyl acetate, and copolymers and mixtures thereof.

11. The multi-layer barrier film of claim 8, wherein the at least one core, second, and third layer are independently comprised of one or more adjacent layers of the same polymer or polymer nanocomposite.

12. The multi-layer barrier film of claim 8, wherein the at least one second layer and the at least one third layer are independently up to about 4 mils thick.

13. The multi-layer barrier film of claim 8, further comprising one or more adhesive layers comprised of an adhesive selected from ethylene methacrylic acid, ethylene acrylic acid, maleic anhydride modified polyolefin polymer, ethylene vinyl acetate, and combinations thereof.

14. The multi-layer barrier film of claim 8, wherein at least one of the at least one second layer and the at least one third layer are flame resistant.

15. The multi-layer barrier film of claim 8, wherein the multi-layer barrier film has an after flame of at least less than about 5 seconds as determined using an ASTM D6413 method.

16. The multi-layer barrier film of claim 8, wherein the multi-layer barrier film is non-dripping.

17. The multi-layer barrier film of claim 8, wherein the at least one second layer and at least one third layer further comprise one or more additives selected from at least one flame retardant, at least one anti-dripping agent, at least one antioxidant, at least one pigment, colorant, or dye, and combinations thereof.

18. The multi-layer barrier film of claim 17, wherein the flame retardant is selected from clay, silicate clays, modified clays, antimony oxide, antimony trioxide, arsenic, octadecanoic acid, aluminum salt, aluminum tristerate, lead oxide, 1H-isoindole-1,3(2H)-dione,2,2'-(1,2-ethanediyl)BIS(4,5,6, 7-tetrabromo) chlorinated parrafins, halogenated flame retardants, and phosphorous based flame retardant additives.

19. The multi-layer barrier film of claim 8, further comprising one or more material layers to provide a multi-layer barrier laminate.

20. The multi-layer barrier film of claim 19, wherein the material layers are between the at least one core, second, or third layer, or applied to an outer surface of the multi-layer barrier film, or a combination thereof.

21. The multi-layer barrier film of claim 19, wherein the one or more material layers comprise at least one material selected from fabrics, scrims, woven or non-woven polymeric fibers, woven or non-woven polyolefin tape or fibers, woven slit film fabric and combinations thereof, said polymeric fibers selected from polyester, nylon, KEVLAR®, nomex, and combinations thereof, and said woven slit film comprising polyethylene, high density polyethylene (HDPE), polypropylene, and combinations thereof.

22. The multi-layer barrier film of claim 19, wherein the barrier film is used for a liner for a tent or protective clothing.

23. The multi-layer barrier film of claim 19, wherein the barrier film provides a barrier to chemical warfare agents.

24. The multi-layer barrier film of claim 19, wherein one or more of the at least one second, third, or material layers further comprise a flame retardant additive.

25. The multi-layer barrier film of claim 19, wherein the multi-layer barrier film provides a barrier against oxygen, carbon dioxide, water vapor, chemicals, and combinations thereof.

26. The multi-layer barrier film of claim 19, wherein chemical agent breakthrough of the multi-layer barrier film is prevented for greater than about 72 hours when challenged and tested as per TOP-8-2-501 method.

27. The multi-layer barrier film of claim 8, wherein chemical agent breakthrough of the multi-layer barrier film is prevented for a time greater than for other barrier films not having silica particles and having a thickness that is the same as the thickness of the multi-layer barrier film as measured using a TOP-8-2-501 method.

28. The polymer nanocomposite of claim 1, wherein the ethylene vinyl alcohol has from about 25 mol % to about 45 mol % ethylene.

29. The barrier film of claim 6, wherein the ethylene vinyl alcohol has from about 25 mol % to about 45 mol % ethylene.

30. The multi-layer barrier film of claim 8, wherein the polymer nanocomposite comprises ethylene vinyl alcohol having from about 25 mol % to about 45 mol % ethylene.

31. The polymer nanocomposite of claim 1, wherein the silica particles are organically modified silica particles.

* * * * *

UNITED STATES PATENT AND TRADEMARK OFFICE
CERTIFICATE OF CORRECTION

PATENT NO. : 8,784,978 B2  
APPLICATION NO. : 11/562836  
DATED : July 22, 2014  
INVENTOR(S) : Shah et al.

Page 1 of 1

It is certified that error appears in the above-identified patent and that said Letters Patent is hereby corrected as shown below:

On the title page item [75] should read:

Apoorva Shah, Burlington, MA (US); Arjan Giaya, Shrewsbury, MA (US); Yoojeong Kim, Sudbury, MA (US)

Signed and Sealed this  
Fourteenth Day of October, 2014

Michelle K. Lee  
*Deputy Director of the United States Patent and Trademark Office*